United States Patent [19]

Schwitalla

[11] Patent Number: 5,135,070

[45] Date of Patent: Aug. 4, 1992

[54] ACTIVE HYDRAULIC PRESSURE CONTROL

[75] Inventor: J. David Schwitalla, Hermosa Beach, Calif.

[73] Assignee: Aura Systems, Inc., El Segundo, Calif.

[21] Appl. No.: 738,193

[22] Filed: Jul. 30, 1991

[51] Int. Cl.$^5$ .............................................. B62D 5/08
[52] U.S. Cl. .................................. 180/142; 137/596;
137/625.61; 180/143; 60/421
[58] Field of Search ................... 74/881; 180/132, 141,
180/142, 143, 79.1, 79.3; 60/421, 422, 427, 429;
137/596, 625.69, 870, 625.61, 625.64

[56] References Cited

U.S. PATENT DOCUMENTS

| | | | |
|---|---|---|---|
| 3,692,137 | 9/1972 | Inoue | 137/625.61 X |
| 3,870,077 | 3/1975 | Nakamura | 136/614.11 |
| 4,632,638 | 12/1986 | Shibayama et al. | 137/625.69 X |
| 4,694,927 | 9/1987 | Nagae | 180/132 |
| 4,757,980 | 7/1988 | Schubert | 267/139 |
| 4,899,842 | 2/1990 | Emori et al. | 137/625.69 X |
| 4,912,343 | 3/1990 | Stuart | 310/14 |
| 4,926,906 | 5/1990 | Ichihashi et al. | 137/625.69 X |

Primary Examiner—Richard Lorence
Assistant Examiner—William O. Trousdell
Attorney, Agent, or Firm—Anthony T. Cascio

[57] ABSTRACT

An active hydraulic pressure control system includes a sensor, a valve, a controller and an actuator. In accordance with a broad aspect of the present invention, the controller determines a pressure differential between the pressure sensed by the sensor in a high pressure supply line of a hydraulic system and a predetermined pressure. In response to such pressure differential, the actuator drives the valve which has a variable flow orifice to communicate hydraulic fluid between the high pressure supply line and a reservoir of hydraulic fluid to eliminate the pressure differential.

71 Claims, 3 Drawing Sheets

ACTIVE HYDRAULIC PRESSURE CONTROL

FIELD OF THE INVENTION

The present invention relates generally to hydraulic power transmission systems and more particularly to electronic control of hydraulic pressure within such systems.

BACKGROUND OF THE INVENTION

Hydraulic power transmission systems are generally useful for providing useful work on the actuation of a load. The actuation of the load may be solely provided by high pressure hydraulic fluid or may be provided by mechanical apparatus with the hydraulic system providing servo assist to the load actuation. In either type of system, a pump draws hydraulic fluid from a reservoir and pumps such fluid through a high pressure supply line to the load wherein the high pressure fluid may perform work. The fluid is thereafter returned to the reservoir through a low pressure return line.

A motor vehicle power steering system is one particular example of the hydraulic servo assist system in that steering actuation of the tires is provided primarily through a mechanical connection between the steering wheel and the steering tires. In one particular example, the steering wheel is connected at one end of a steering column and a pinion is coaxially carried by the other end of the steering column. The pinion drives a steering rack wherein rotation of the pinion, by turning the steering wheel, is translated into a linear displacement of the steering rack. The steering rack is in turn connected to the tie rod which interconnects the steerable spindle/hub assembly of the vehicle suspension system. The steering tires are mounted to the hub. The combination of the rack and pinion are referred to as a steering gear. Another type of steering gear is the recirculating ball.

In the hydraulic servo assist, the hydraulic pressure acts on the steering gear (in the rack and pinion gear with the resultant force being in the direction of movement of the rack) to reduce steering effort required at the steering wheel to move the steering wheels from the straight ahead position. A typical suspension biases the spindle/hub so that the steering tires return to the straight ahead position in absence of any further steering input. The amount of servo assist is selected to maintain "road feel" of the steering tires at the steering wheel. Usually, excessive assist diminishes road feel and insufficient assist causes unacceptably high steering effort.

The hydraulic pressure in the high pressure supply line required to provide the desired amount of servo assist, or generally in any type of hydraulic power transmission system the desired hydraulic force, is defined as the static hydraulic pressure of the system. By maintaining the static pressure of high pressure supply constant, linearity of the work which the hydraulic fluid performs on the load is ensured. In the particular example of the motor vehicle hydraulic servo assist system, the steering effort required at the steering wheel is strongly dependent on vehicle road speed with the required assist decreasing with increasing road speed. Accordingly, the static pressure in such systems is desirably made an inverse function of road speed, and the prior art has addressed this aspect of static pressure control.

The hydraulic pressure in the high pressure supply line of the power transmission system will also exhibit transients in the static pressure during operation of the system. These transients are a result of conditions at and acting on the load, in the pump, at discontinuities to fluid flow such as at valves and junctions, and any other condition known in fluid dynamics to cause unwanted fluid oscillations and wave energy and oscillations. These transients define the dynamic pressure of the hydraulic fluid in the high pressure supply line.

In the motor vehicle servo assist system, the dynamic pressure is a result of several unrelated and unpredictable occurrences. For example, during straight ahead driving, a hydraulic valve at the servo assist is closed so that strong "on center" feel is achieved. At the moment there is a steering input, this valve is opened and the fluid directed to perform work acting on the steering rack in the direction of the movement. The opening, and subsequent closing of this valve upon returning to straight ahead, develops pressure transients in the high pressure supply line which can be felt at the steering wheel as kickback, thereby degrading true road feel.

Furthermore the hydraulic fluid pump is typically belt driven from the engine which does not operate at constant speed. Accordingly, the pumping pulses applied to the high pressure line vary with engine, and not road, speed such that a transmission shift during a turn at constant road speed will cause a change in steering feel due to the change of engine speed. In addition, road irregularities encountered at either steering wheel will transmit shock and vibrations to the steering rack which in turn develop further dynamic pressure in the high pressure line. Road irregularities and shock are felt as at the steering wheel if the dynamic pressure is not properly damped. Also, chassis dynamics of the vehicle will cause slight variations in alignmnet and placement of the various steering system components with respect to each other. These variations will also introduce unwanted dynamic pressure.

A prior art solution to provide for the damping of the dynamic pressure, regardless of its source, is to install a reservoir in the high pressure line to act as a resonant cavity to tune the high pressure fluid to low frequencies so that the static pressure is undisturbed and the dynamic pressure is damped. However, a disadvantage and limitation of such a cavity is that the overall bandwidth of the hydraulic system is accordingly reduced. Therefore, response of the hydraulic system is degraded. In the motor vehicle servo assisted steering, degraded hydraulic response will cause steering assist to be applied too slowly during rapid steering maneuvering, such as during a swerve and recovery.

SUMMARY OF THE INVENTION

It is accordingly an object of the present invention to overcome one or more limitations of the prior art hereinabove discussed. It is also an object of the present invention to provide an active hydraulic pressure control system useful in both hydraulic power transmission and hydraulic servo assist systems. It is a further object of the present invention to provide an active hydraulic pressure control system particularly useful in motor vehicle power steering systems.

According to the present invention, an active hydraulic pressure control system includes a sensor, a valve, a controller and an actuator. In accordance with a broad aspect of the present invention, the controller determines a pressure differential between the pressure sensed by the sensor in a high pressure supply line of a hydraulic system and a predetermined pressure. In response to such pressure differential, the actuator drives the valve which has a variable flow orifice to communicate hydraulic fluid between the high pressure supply line and a reservoir of hydraulic fluid to eliminate the presssure differential.

These and other objects, advantages and features of the present invention will become readily apparent to those skilled in the art from a study of the following Description of an Exemplary Preferred Embodiment when read in conjunction with the attached Drawing and appended Claims.

DESCRIPTION OF AN EXEMPLARY PREFERRED EMBODIMENT

Figure 1:
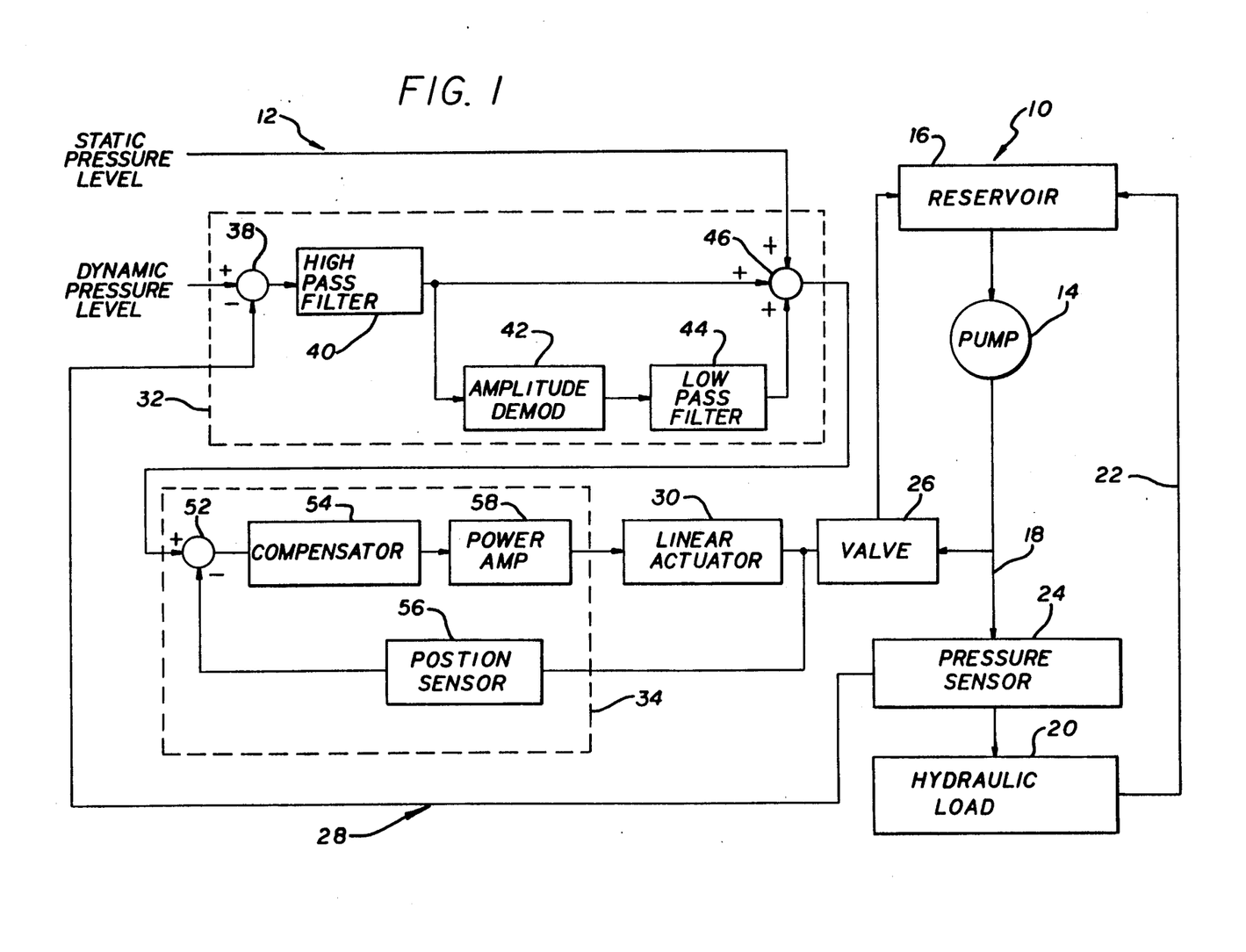
FIG. 1 is a block diagram of an active hydraulic pressure control system for a hydraulic fluid power transmission system or a hydraulic fluid servo assist system.

Referring to FIG. 1, there is shown a hydraulic fluid power transmission system 10 incorporating an active hydraulic pressure control system 12 which is constructed according to the principles of the present invention. The power transmission system 10 includes a hydraulic pump 14, a reservoir 16, a high pressure supply line 18, a hydraulic fluid actuated load 20 and a return line 22. The pump 14 supplies hydraulic fluid from the reservoir 16 through the high pressure supply line 18 to the load 20, where at the high pressure fluid performs useful work usually through a hydraulic actuator (not shown) as is well known in the art. After the fluid performs such work, the hydraulic fluid is returned to the reservoir 16 through the low pressure return line 22.

The active hydraulic pressure control system 12 includes a sensor 24, a valve 26, a controller 28 and an actuator 30. In accordance with the broad aspect of the present invention, the controller 28 determines a pressure differential between the pressure sensed by the sensor 24 and a predetermined pressure. In response to such pressure differential, the actuator 30 drives the valve 26 which has a variable flow orifice to communicate hydraulic fluid between the high pressure supply line 18 and the reservoir 16, as best seen in FIG. 1, to eliminate the pressure differential. Generally, the controller 28, the valve 26 and the actuator 30 are arranged so that the hydraulic fluid flow through the variable orifice is increased or decreased in response to the pressure differential being positive or negative, respectively. For example, the instantaneous pressure in the supply line 18 is excessive, the actuator 30 is commanded by the controller 28 to open the valve 26 such that the flow through its orifice is increased effectively to bleed off the excess energy in the high pressure fluid.

To command the actuator 30, the controller 28 includes a flow control circuit 32 and a position control circuit 34. The flow control circuit 32 is responsive to a sensed pressure electrical signal and a predetermined pressure electrical signal to develop a first command signal as a function of each of the above sensed and predetermined pressure signals. The position control circuit 34 is responsive to the first command signal and a sensed actuator position electrical signal to develop a second command signal as a function of each of the first command and actuator position signals. The second command signal is applied to the actuator 30 to actuate the valve 26 to effect the active pressure control. The pressure sensor 24 transduces hydraulic fluid pressure to develop the sensed pressure signal.

More particularly, the flow control circuit 32 includes a subtracter 38 and a high pass filter 40. The subtracter 38 develops an error signal as a difference between the predetermined pressure signal and the sensed pressure signal. The high pass filter 40 develops a first filtered electrical signal from the error signal. The first command signal, described hereinabove, is linearly commensurate with the first filtered signal. In one particular embodiment of the present invention, the high pass filter 40 has a cutoff frequency above the desired bandwidth of the hydraulic pressure response in the power transmission system 10.

The flow control circuit 32 further includes an amplitude demodulator 42, a low pass filter 44 and a summer 46. The demodulator 42 develops a demodulated signal from the first filtered signal to extract amplitude information therefrom. The low pass filter 44 develops a second filtered signal from the demodulated signal. The summer 46 develops the hereinabove described first command signal as a summation of the first filtered signal and the second filtered signal. The low pass filter 44 has a cutoff frequency selected to remove high frequency noise from the demodulated signal.

Figure 2:
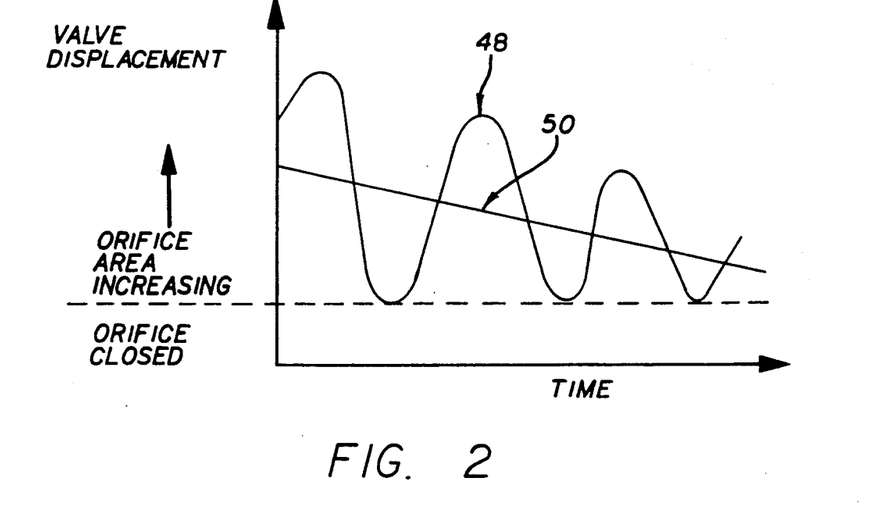
FIG. 2 diagrammatically illustrates the operation of a portion of the flow control circuit of FIG. 1.

With further reference to FIG. 2, there is shown a diagram of the effective cross sectional area of the variable flow orifice of the valve 26 to demonstrate the effects the first command signal developed by the flow control circuit 32 has on this effective cross sectional area plotted as a function of time. When the first filtered signal from the high pass filter 40 is summed at the summer 46 with the second filtered signal from the low pass filter 44, the first command signal will thus have two separate components. These components are a dynamic signal component and a static (or bias) signal component. When the actuator 30 is a linear electromagnetic actuator of known construction, these signal components will linearly effect the effective cross sectional area of the variable flow orifice of the valve 26. Accordingly, the dynamic component relates to a dynamic displacement 48 of the valve 26 and the static component relates to a static displacement 50 of the valve 26, wherein displacement relates to the change of the effective cross sectional area of the variable flow orifice, as best seen in FIG. 2.

More particularly, the dynamic displacement 48 relates to the total change in the variable flow orifice cross sectional area, and the static displacement 50 relates to the static orifice cross sectional area as measured from a fully closed condition. Without the inclusion of the demodulator 42, the valve 26 would have its orifice cross sectional area oscillated about its closed position to provide active pressure control in accordance with the present invention.

However, the inclusion of the demodulator 42 adds a static or bias displacement, shown as displacement 50, to the dynamic displacement 48. In this configuration, the valve 26 will only close when there is little or no input signal. Since the static displacement 50 is linearly proportional to the amplitude of the first filtered signal, the valve 26 is allowed to remain open when needed and to be closed when inactive. Furthermore, the valve 26 can only reduce hydraulic pressure in the supply line 18 and not increase it. Therefore, it is desirable in one particular embodiment of the present invention to keep the valve 26 open to effect the system 10 continuously. The demodulator 42 accomplishes this result to increase the overall effectiveness of the valve 26 in the hydraulic power transmission system 10.

In the above described embodiment of the present invention, the predetermined pressure signal applied to the subtracter 38 is derived commensurately with a predetermined desired dynamic pressure in the high pressure supply line 18. It is also contemplated that a second predetermined pressure signal may be applied to the summer 46. This second predetermined pressure signal will control the static pressure in the high pressure supply line 18 by controlling orifice cross sectional area as described above, and is accordingly developed commensurately with a predetermined static pressure. In some applications, which will be described in greater detail hereinbelow, it is highly desirable to modulate static pressure as conditions at the load 20 change.

Continuing with the description of the controller 28, the position control circuit 34 includes a subtracter 52 and a compensator 54. The subtracter 52 develops a second error signal as a difference between the first command signal, described hereinabove, and the sensed position signal. The compensator 54 develops a third filtered signal from the second error signal. The second command signal is linearly commensurate with the third filtered signal. A position sensor 56 transduces position of the actuator 30 to the sensed position signal. The position control circuit 34 may also include a power amplifier 58, as needed, to develop the second command signal from the third filtered signal.

The compensator 54 performs conventional PID compensation as is known in position control loops. The PID compensation may be proportional, integral or differential functions, or any combination of these. The selection is determined by the choice of actuator 30 and valve 26.

Figure 3:
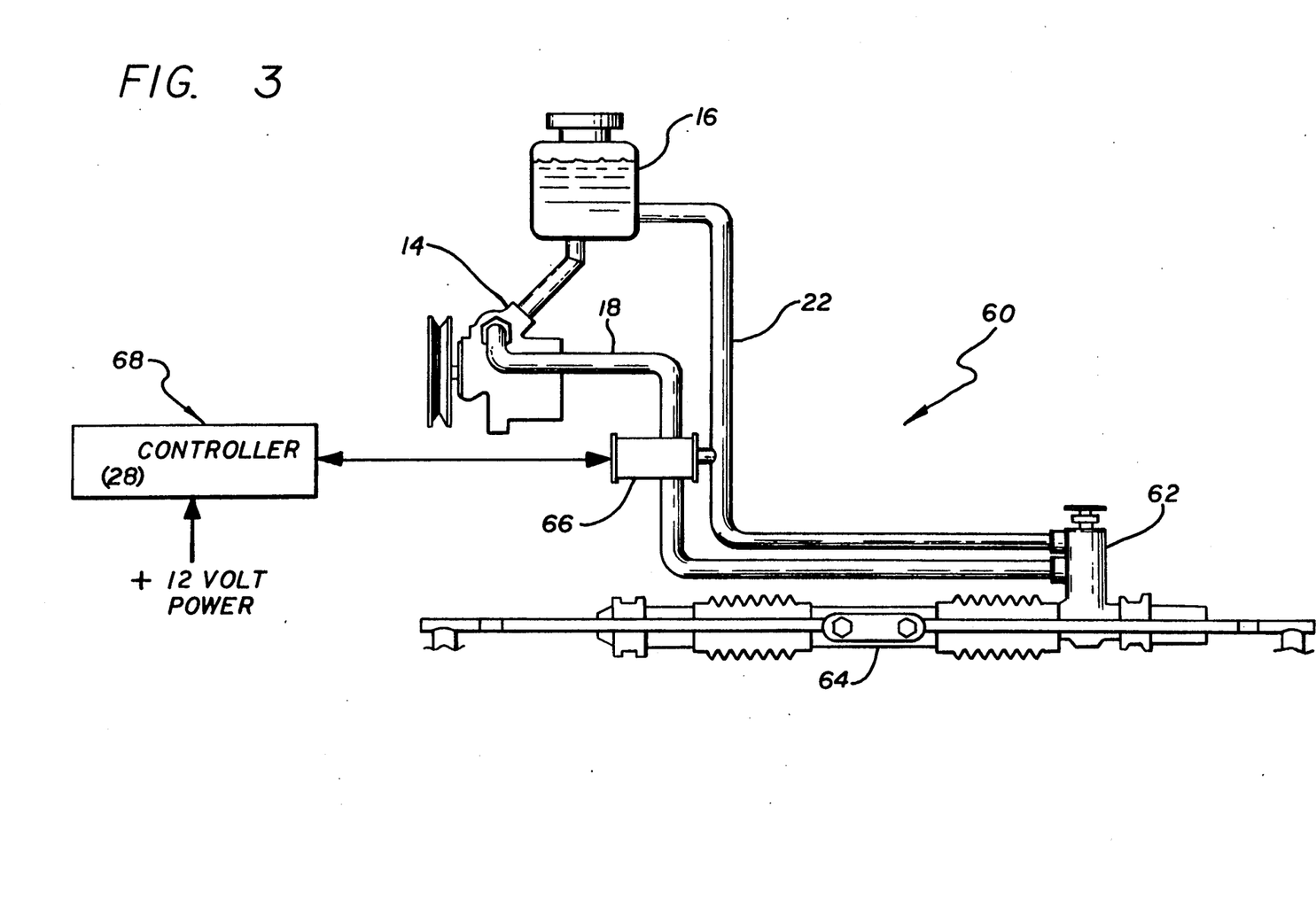
FIG. 3 is a schematic diagram of the active hydraulic pressure control system as used with a motor vehicle hydraulic assist steering system.
Figure 4:
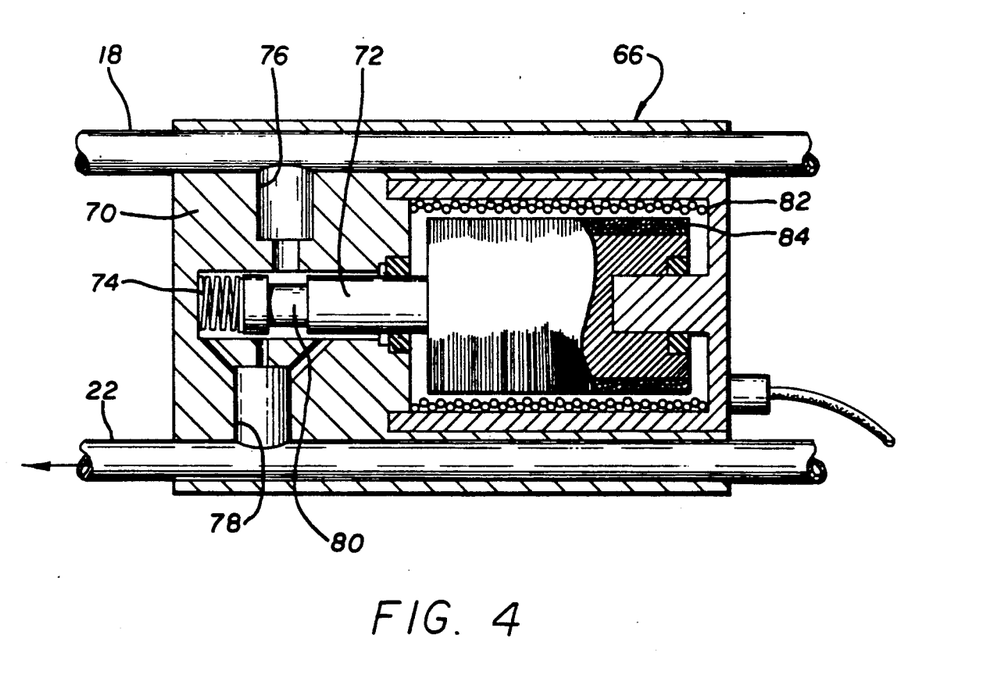
FIG. 4 is a portion of FIG. 3 shown in greater detail in one particular embodiment thereof.

With further reference to FIG. 3 and FIG. 4, the utility of the above described active pressure control system 12 with respect to one contemplated use in a motor vehicle power steering assist system 60 is described. The steering assist system 60 includes the pump 14, the reservoir 16, the high pressure supply line 18 and the return line 22, similarly as described hereinabove with respect to the hydraulic power transmission system 10. In the power steering system 60, however, the load 20 is a hydraulic servo assist 62 acting on a steering gear 64, as is well known.

The pressure sensor 24, the valve 26 and the actuator 30 may be assembled into a module 66, a best seen in FIG. 4 for connection to the high pressure line 18 and the return line 22. The controller 28 may be constructed on a circuit card 68 remote from the module 66. In this particular application, the valve 26 is preferably a spool valve having a valve body 70, which is formed from the housing of the module 66, and a spool 72. The valve body 70 has a cylindrical bore 74 closed at one end thereof, an inlet opening 76 to communicate hydraulic fluid from the supply line 18 to the bore 74, and an outlet opening 78 to communicate hydraulic fluid from the bore 74 to the reservoir 16 which may be through the return line 22. The spool 72 is received in axially slideable engagement within the bore 74 and has an annular channel 80. The channel 80, the inlet opening 76 and the outlet opening 78 are each disposed with respect to each other such that during axial movement of the spool 72 along its total stroke, the inlet opening 76 communicates with the bore 74 through the annular channel 80. The annular channel 80 is varied in communication with the outlet opening 78 thereby effectively modulating its cross sectional area to vary flow of hydraulic fluid therethrough.

The actuator 30 has a core 82 and a coil 84 to which the second command signal form the controller 28 is applied. The coil 84 is further mechanically coupled directly to the spool 72 in the module 66 in the presently described embodiment of the invention. The spool valve is chosen for its linear behavior so that the components of the first command signal as described in conjuction with FIG. 2 may linearly displace the spool to effect the displacement curves 48, 50 as described. The actuator 30 may be a linear electromagnetic actuator of the type described in U.S. Pat. No. 4,912,343.

In the application of the active hydraulic pressure control system 12 to the steering assist system 60, the first predetermined pressure signal is commensurate with the desired dynamic pressure as discussed hereinabove. Furthermore, the second predetermined pressure signal may be varied with road speed to provide a static or bias pressure within the steering assist system 60 to realize speed sensitive variable hydraulic assist. It is desirable to decrease assist as road speed increases since steering effort is generally greatest when a vehicle is stationary and at very low speeds during parking. Steering effort then decreases with increasing speed. At sufficiently high speeds, little or no assist is needed. The second or static pressure signal will readily allow for such biasing.

There has been described hereinabove a novel active pressure hydraulic control system. Those skilled in the art may now make numerous uses of and departures from the above described embodiments of the present invention without departing from the inventive concepts disclosed herein. Accordingly, the present invention is to be defined solely in accordance with the following claims.

I claim:

1. An active hydraulic pressure control system comprising:
    a sensor to sense pressure of hydraulic fluid within a high pressure supply line of a hydraulic power transmission system;
    a valve having a variable flow orifice, said orifice to communicate hydraulic fluid between said supply line and a reservoir of hydraulic fluid;
    a controller responsive to the sensed pressure and a predetermined pressure to determine a pressure differential therebetween; and
    an actuator responsive to the pressure differential to actuate said valve so that hydraulic fluid flow through said orifice is varied to eliminate the pressure differential.

2. A system as set forth in claim 1 wherein said controller includes:
    a flow control circuit responsive to a sensed pressure electrical signal and a predetermined pressure electrical signal to develop a first command electrical signal as a function of each of said sensed pressure signal and said predetermined pressure signal; and a pinion control circuit responsive to said first command signal and a sensed actuator position electrical signal to develop a second command electrical signal as a function of each of said first command signal and said sensed actuator position signal, said second command signal being applied to said actuator to actuate said valve in response thereto.

3. A system as set forth in claim 2 wherein said flow control circuit includes:
a subtracter to develop an error signal as a difference between said predetermined pressure signal and said sensed pressure signal; and
a high pass filter to develop a first filtered electrical signal from said error signal, said first command signal being linearly commensurate with said first filtered signal.

4. A system as set forth in claim 3 wherein said flow control circuit further includes:
an amplitude demodulator to develop a demodulated electrical signal from said filtered signal;
a low pass filter to develop a second filtered signal from said demodulated signal; and
a summer to develop said first command signal as a summation of said first filtered signal and said second filtered signal.

5. A system as set forth in claim 4 wherein said summer is further responsive to a second predetermined pressure electrical signal to develop said first command signal as a summation of said first filtered signal, said second filtered signal and said second pressure signal.

6. A system as set forth in claim 5 wherein said first pressure signal is commensurate with a predetermined dynamic pressure in said supply line, and said second pressure signal is commensurate with a predetermined static pressure in said supply line.

7. A system as set forth in claim 4 wherein said low pass filter has a cutoff frequency selected to remove high frequency noise from said demodulated signal.

8. A system as set forth in claim 3 wherein said high pass filter has a cutoff frequency above a desired bandwidth of hydraulic pressure in said power transmission system.

9. System as set forth in claim 2 wherein said sensor transduces hydraulic fluid pressure to said sensed pressure signal.

10. A system as set forth in claim 2 wherein said position control circuit includes:
a subtracter to develop an error signal as a difference between said first command signal and said sensed position signal; and
a compensator to develop a filtered signal from said error signal, said second command signal being linearly commensurate with said filtered signal.

11. A system as set forth in claim 10 wherein said position control circuit includes a power amplifier to which said filtered signal is applied to develop said second command signal.

12. A system as set forth in claim 10 wherein said position control circuit further includes:
a position sensor to transduce actuator position to said sensed position signal.

13. A system as set forth in claim 10 wherein said compensator develops said filtered signal as a selected function of said error signal, said selected function being selected ones of proportional, integral and derivative functions.

14. A system as set forth in claim 1 wherein said actuator is an electromagnetic linear actuator.

15. For a hydraulic power transmission system wherein a pump supplies hydraulic fluid from a reservoir through a high pressure supply line to a hydraulic fluid actuated load and said fluid returns from said load through a low pressure return line to said reservoir, and active hydraulic pressure control system comprising:
a sensor to sense pressure of hydraulic fluid within said high pressure supply line;
a valve having a variable flow orifice, said orifice to communicate hydraulic fluid between said supply line and said reservoir;
a controller responsive to the sensed pressure and a predetermined pressure to determine a pressure differential therebetween; and
an actuator responsive to the pressure differential to actuate said valve so that hydraulic fluid flow through said orifice is varied to eliminate the pressure differential.

16. A system as set forth in claim 15 wherein said controller includes:
a flow control circuit responsive to a sensed pressure electrical signal and a predetermined pressure electrical signal to develop a first command electrical signal as a function of each of said sensed pressure signal and said predetermined pressure signal; and
a position control circuit responsive to said first command signal and a sensed actuator position electrical signal to develop a second command electrical signal as a function of each of said first command signal and said sensed actuator position signal, said second command signal being applied to said actuator to actuate said valve in response thereto.

17. A system as set forth in claim 16 wherein said flow control circuit includes:
a subtracter to develop an error signal as a difference between said predetermined pressure signal and said sensed pressure signal; and
a high pass filter to develop a first filtered electrical signal from said error signal, said first command signal being linearly commensurate with said first filtered signal.

18. A system as set forth in claim 17 wherein said flow control circuit further includes:
an amplitude demodulator to develop a demodulated electrical signal from said filtered signal;
a low pass filter to develop a second filtered signal from said demodulated signal; and
a summer to develop said first command signal as a summation of said first filtered signal and said second filtered signal.

19. A system as set forth in claim 18 wherein said summer is further responsive to a second predetermined pressure electrical signal to develop said first command signal as a summation of said first filtered signal, said second filtered signal and said second pressure signal.

20. A system as set forth in claim 19 wherein said first pressure signal is commensurate with a predetermined dynamic pressure in said supply line, and said second pressure signal is commensurate with a predetermined static pressure in said supply line.

21. A system as set forth in claim 20 wherein said low pass filter has a cutoff frequency selected to remove high frequency noise from said demodulated signal.

22. A system as set forth in claim 17 wherein said high pass filter has a cutoff frequency above a desired bandwidth of hydraulic pressure in said power transmission system.

23. A system as set forth in claim 16 wherein said sensor transduces hydraulic fluid pressure to said sensed pressure signal.

24. A system as set forth in claim 16 wherein said position control circuit includes:
- a subtracter to develop an error equal as a difference between said first command signal and said sensed position signal; and
- a compensator to develop a filtered signal from said error signal, said second command signal being linearly commensurate with said filtered signal.

25. A system as set forth in claim 24 wherein said position control circuit includes a power amplifier to which said filtered signal is applied to develop said second command signal.

26. A system as set forth in claim 24 wherein said position control circuit further includes:
- a position sensor to transduce actuator position to said sensed position signal.

27. A system as set forth in claim 24 wherein said compensator develops said filtered signal as a selected function of said error signal, said selected function being selected ones of proportional, integral and derivative functions.

28. A system as set forth in claim 15 wherein said actuator is an electromagnetic linear actuator.

29. For a hydraulic servo system wherein a pump supplies hydraulic fluid from a reservoir through a high pressure supply line to a hydraulic servo and said fluid returns from said servo through a low pressure return line to said reservoir, an active hydraulic pressure control system comprising:
- a sensor to sense pressure of hydraulic fluid within said high pressure supply line;
- a valve having a variable flow orifice, said orifice to communicate hydraulic fluid between said supply line and said reservoir;
- a controller responsive to the sensed pressure and a predetermined pressure to determine a pressure differential therebetween; and
- an actuator responsive to the pressure differential to actuate said valve so that hydraulic fluid flow through said orifice is varied to eliminate the pressure differential.

30. A system as set forth in claim 29 wherein said controller includes:
- a flow control circuit responsive to a sensed pressure electrical signal and a predetermined pressure electrical signal to develop a first command electrical signal as a function of each of said sensed pressure signal and said predetermined pressure signal; and
- a position control circuit responsive to said first command signal and a sensed actuator position electrical signal to develop a second command electrical signal as a function of each of said first command signal and said sensed actuator position signal, said second command signal being applied to said actuator to actuate said valve in response thereto.

31. A system as set forth in claim 30 wherein said said flow control circuit includes:
- a subtractor to develop an error signal as a difference between said predetermined pressure signal and said sensed pressure signal; and
- a high pass filter to develop a first filtered electrical signal from said error signal, said first command signal being linearly commensurate with said first filtered signal.

32. A system as set forth in claim 31 wherein said flow control circuit further includes:
- an amplitude demodulator to develop a demodulated electrical signal from said filtered signal;
- a low pass filter to develop a second filtered signal from said demodulated signal; and
- a summer to develop said first command signal as a summation of said first filtered signal and said second filtered signal.

33. A system as set forth in claim 32 wherein said summer is further responsive to a second predetermined pressure electrical signal to develop said first command signal as a summation of said first filtered signal, said second filtered signal and said second pressure signal.

34. A system as set forth in claim 33 wherein said first pressure signal is commensurate with a predetermined dynamic pressure in said supply line, and said second pressure signal is commensurate with a predetermined static pressure in said supply line.

35. A system as set forth in claim 34 wherein said low pass filter has a cutoff frequency selected to remove high frequency noise from said demodulated signal.

36. A system as set forth in claim 31 wherein said high pass filter has a cutoff frequency above a desired bandwidth of hydraulic pressure in said hydraulic servo system.

37. A system as set forth in claim 30 wherein said sensor transduces hydraulic fluid pressure to said sensed pressure signal.

38. A system as set forth in claim 30 wherein said position control circuit includes:
- a subtracter to develop an error signal as a difference between said first command signal and said sensed position signal; and
- a compensator to develop a filtered signal from said error signal, said second command signal being linearly commensurate with said filtered signal.

39. A system as set forth in claim 38 wherein said position control circuit includes a power amplifier to which said filtered signal is applied to develop said second command signal.

40. A system as set forth in claim 38 wherein said position control circuit further includes:
- a position sensor to transduce actuator position to said sensed position signal.

41. A system as set forth in claim 38 wherein said compensator develops said filtered signal as a selected function of said error signal, said selected function being selected ones of proportional, integral and derivative functions.

42. A system as set forth in claim 29 wherein said actuator is an electromagnetic linear actuator.

43. For a hydraulic power steering assist system in a motor vehicle wherein said assist system has an engine driven hydraulic pump which supplies hydraulic fluid from a reservoir through a high pressure supply line to a hydraulic servo assist to act on a steering rack and said fluid returns from said servo assist through a low pressure return line to said reservoir, an active hydraulic pressure control system comprising:
- a sensor to sense pressure of hydraulic fluid within said high pressure supply line;
- a valve having a variable flow orifice, said orifice to communicate hydraulic fluid between said supply line and said reservoir;
- a controller responsive to the sensed pressure and a predetermined pressure to determine a pressure differential therebetween; and an actuator responsive to the pressure differential to actuate said valve so that hydraulic fluid flow through said orifice is varied to eliminate the pressure differential.

44. A system as set forth in claim 43 wherein said controller includes:
a flow control circuit responsive to a sensed pressure electrical signal and a predetermined pressure electrical signal to develop a first command electrical signal as a function of each of said sensed pressure signal and said predetermined pressure signal; and
a position control circuit responsive to said first command signal and a sensed actuator position electrical signal to develop a second command electrical signal as a function of each of said first command signal and said sensed actuator position signal, said second command signal being applied to said actuator to actuate said valve in response thereto.

45. A system as set forth in claim 44 wherein said said flow control circuit includes:
a subtracter to develop an error signal as a difference between said predetermined pressure signal and said sensed pressure signal; and
a high pass filter to develop a first filtered electrical signal from said error signal, said first command signal being linearly commensurate with said first filtered signal.

46. A system as set forth in claim 45 wherein said flow control circuit further includes:
an amplitude demodulator to develop a demodulated electrical signal from said filtered signal;
a low pass filter to develop a second filtered signal from said demodulated signal; and
a summer to develop said first command signal as a summation of said first filtered signal and said second filtered signal.

47. A system as set forth in claim 46 wherein said summer is further responsive to a second predetermined pressure electrical signal to develop said first command signal as a summation of said first filtered signal, said second filtered signal and said second pressure signal.

48. A system as set forth in claim 47 wherein said first pressure signal is commensurate with a predetermined dynamic pressure in said supply line, and said second pressure signal is commensurate with a predetermined static pressure in said supply line.

49. A system as set forth in claim 48 wherein said low pass filter has a cutoff frequency selected to remove high frequency noise from said demodulated signal.

50. A system as set forth in claim 45 wherein said high pass filter has a cutoff frequency above a desired bandwidth of hydraulic pressure in said power steering assist system.

51. A system as set forth in claim 44 wherein said sensor transduces hydraulic fluid pressure to said sensed pressure signal.

52. A system as set forth in claim 44 wherein said position control circuit includes:
a subtracter to develop an error signal as a difference between said first command signal and said sensed position signal; and
a compensator to develop a filtered signal from said error signal, said second command signal being linearly commensurate with said filtered signal.

53. A system as set forth in claim 52 wherein said position control circuit includes a power amplifier to which said filtered signal is applied to develop said second command signal.

54. A system as set forth in claim 52 wherein said position control circuit further includes:
a position sensor to transduce actuator position to said sensed position signal.

55. A system as set forth in claim 52 wherein said compensator develops said filtered signal as a selected function of said error signal, said selected function being selected ones of proportional, integral and derivative functions.

56. A system as set forth in claim 43 wherein said actuator is an electromagnetic linear actuator.

57. A motor vehicle hydraulic power steering assist system comprising:
a reservoir of hydraulic fluid;
an engine driven hydraulic pump;
a hydraulic servo assist to act on a steering gear of a motor vehicle;
a high pressure supply line interconnected between said pump and said servo assist;
a low pressure return line interconnected between said servo assist and said reservoir, said pump delivering hydraulic fluid from said reservoir to said servo assist through said supply line, hydraulic fluid being returned from said servo assist to said reservoir through said return line;
a sensor to sense pressure of hydraulic fluid within said high pressure supply line;
a valve having a variable flow orifice, said orifice to communicate hydraulic fluid between said supply line and said reservoir;
a controller responsive to the sensed pressure and a predetermined pressure to determine a pressure differential therebetween; and
an actuator responsive to the pressure differential to actuate said valve so that hydraulic fluid flow through said orifice is varied to eliminate the pressure differential.

58. A system as set forth in claim 57 wherein said controller includes:
a flow control circuit responsive to a sensed pressure electrical signal and a predetermined pressure electrical signal to develop a first command electrical signal as a function of each of said sensed pressure signal and said predetermined pressure signal; and
a position control circuit responsive to said first command signal and a sensed actuator position electrical signal to develop a second command electrical signal as a function of each of said first command signal and said sensed actuator position signal, said second command signal being applied to said actuator to actuate said valve in response thereto.

59. A system as set forth in claim 58 wherein said said flow control circuit includes:
a subtracter to develop an error signal as a difference between said predetermined pressure signal and said sensed pressure signal; and
a high pass filter to develop a first filtered electrical signal from said error signal, said first command signal being linearly commensurate with said first filtered signal.

60. A system as set forth in claim 59 wherein said flow control circuit further includes:
an amplitude demodulator to develop a demodulated electrical signal from said filtered signal;
a low pass filter to develop a second filtered signal from said demodulated signal; and a summer to develop said first command signal as a summation of said first filtered signal and said second filtered signal.

61. A system as set forth in claim 60 wherein said summer is further responsive to a second predetermined pressure electrical signal to develop said first command signal as a summation of said first filtered signal, said second filtered signal and said second pressure signal.

62. A system as set forth in claim 61 wherein said first pressure signal is commensurate with a predetermined dynamic pressure in said supply line, and said second pressure signal is commensurate with a predetermined static pressure in said supply line.

63. A system as set forth in claim 62 wherein said low pass filter has a cutoff frequency selected to remove high frequency noise from said demodulated signal.

64. A system as set forth in claim 59 wherein said high pass filter has a cutoff frequency above a desired bandwidth of hydraulic pressure is said power steering assist system.

65. A system as set forth in claim 58 wherein said sensor transduces hydraulic fluid pressure to said sensed pressure signal.

66. A system as set forth in claim 58 wherein said position control circuit includes:
  a subtracter to develop an error signal as a difference between said first command signal and said sensed position signal; and
  a compensator to develop a filtered signal from said error signal, said second command signal being linearly commensurate with said filtered signal.

67. A system as set forth in claim 66 wherein said position control circuit includes a power amplifier to which said filtered signal is applied to develop said second command signal.

68. A system as set forth in claim 66 wherein said position control circuit further includes:
  a position sensor to transduce actuator position to said sensed position signal.

69. A system as set forth in claim 66 wherein said compensator develops said filtered signal as a selected function of said error signal, said selected function being selected ones of proportional, integral and derivative functions.

70. A system as set forth in claim 58 where said actuator is a linear electromagnetic actuator having a core and a coil to which said second command signal is applied, said coil being mechanically coupled to said valve to actuate said valve, said coil being displaced in linear proportionality to said second command signal when applied thereto.

71. A system as set forth in claim 70 wherein said valve is a spool valve having a valve body and a spool, said valve body having a cylindrical bore closed at one end thereof, an inlet opening to communicate hydraulic fluid from said supply line to said bore and an outlet opening to communicate hydraulic fluid from said bore to said reservoir, said spool being received in axially slideable engagement within said bore and having an annular channel, said channel, said inlet opening and said outlet opening each being disposed with respect to each other such that during axial movement of said spool along its total stroke said inlet opening communicates with said bore through said annular channel and said annular channel is varied in communication with said outlet opening to vary flow of hydraulic fluid therethrough.

* * * * *